US012791818B2

(12) United States Patent
Wang et al.

(10) Patent No.: US 12,791,818 B2
(45) Date of Patent: Nov. 10, 2026

(54) DRIVING MECHANISM

(71) Applicant: Actutek Corporation, Taoyuan City (TW)

(72) Inventors: Ying-Jen Wang, Taoyuan City (TW); Yi-Ho Chen, Taoyuan City (TW); Ya-Hsiu Wu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 130 days.

(21) Appl. No.: 18/896,162

(22) Filed: Sep. 25, 2024

(65) Prior Publication Data

US 2025/0102880 A1 Mar. 27, 2025

Related U.S. Application Data

(60) Provisional application No. 63/584,983, filed on Sep. 25, 2023.

(51) Int. Cl.

| | |
|---|---|
| ***G02B 7/02*** | (2021.01) |
| ***G02B 5/00*** | (2006.01) |
| ***G02B 7/09*** | (2021.01) |
| ***G02B 27/64*** | (2006.01) |
| ***G03B 3/10*** | (2021.01) |
| ***G03B 7/095*** | (2021.01) |
| ***G03B 9/42*** | (2021.01) |
| ***G03B 11/04*** | (2021.01) |
| ***G06F 1/16*** | (2006.01) |
| ***H02K 41/035*** | (2006.01) |

(52) U.S. Cl.

CPC ............... *G02B 7/02* (2013.01); *G02B 5/005* (2013.01); *G02B 7/09* (2013.01); *G02B 27/64* (2013.01); *G03B 3/10* (2013.01); *G03B 7/095* (2013.01); *G03B 9/42* (2013.01); *G03B 11/043* (2013.01); *G06F 1/1677* (2013.01); *H02K 41/0354* (2013.01)

(58) Field of Classification Search

CPC . G02B 7/02; G02B 5/005; G02B 7/09; G02B 27/64; G02B 7/08; G02B 27/646; G03B 3/10; G03B 7/095; G03B 9/42; G03B 11/043; G03B 2205/0069; G03B 30/00; G06F 1/1677; H02K 41/0354; H02K 41/0356

See application file for complete search history.

(56) References Cited

U.S. PATENT DOCUMENTS

| | | | | |
|---|---|---|---|---|
| 11,513,308 B2 * | 11/2022 | Park | .......................... | G03B 3/10 |
| 2020/0083793 A1 * | 3/2020 | Han | ...................... | G02B 27/646 |
| 2023/0185161 A1 * | 6/2023 | Lee | .......................... | G03B 3/10<br>359/554 |
| 2023/0288777 A1 * | 9/2023 | Son | .......................... | G03B 5/04 |
| 2024/0094597 A1 * | 3/2024 | Song | ........................ | G03B 3/10 |
| 2025/0013121 A1 * | 1/2025 | Hyun | ........................ | G03B 5/04 |
| 2025/0237883 A1 * | 7/2025 | Hou | ...................... | G02B 27/646 |
| 2025/0287102 A1 * | 9/2025 | Jang | .......................... | G03B 3/10 |
| 2025/0306432 A1 * | 10/2025 | Chun | ........................ | G03B 3/10 |

* cited by examiner

*Primary Examiner* — Shahbaz Nazrul

(74) *Attorney, Agent, or Firm* — MUNCY, GEISSLER, OLDS & LOWE, P.C.

(57) ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the optical element relative to the fixed part.

18 Claims, 14 Drawing Sheets

DRIVING MECHANISM

CROSS REFERENCE TO RELATED APPLICATIONS

This application claims the benefit of U.S. provisional application No. 63/584,983, filed Sep. 25, 2023, the entirety of which is incorporated by reference herein.

BACKGROUND OF THE INVENTION

Field of the Invention

The present invention relates to a driving mechanism, and, in particular, it relates to a driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

Electronic devices usually use several coils and magnets for adjusting the focus of a lens. However, miniaturization of these electronic devices may increase the difficulty of mechanical design, and it may also lead to low reliability and a low positioning accuracy of the driving mechanism. It has been a challenge to address this problem.

BRIEF SUMMARY OF THE INVENTION

An embodiment of the present invention provides a driving mechanism for moving an optical element. The driving mechanism includes a fixed part, a movable part, and a driving assembly. The movable part is movably connected to the fixed part for holding the optical element. The driving assembly is configured for moving the optical element relative to the fixed part.

In some embodiments, the driving mechanism further includes a flexible circuit board and a circuit substrate disposed on the fixed part. The driving assembly includes a longitudinal first magnetic element, a first coil, and a second coil. The first magnetic element is disposed on the movable part, the first and second coils are disposed in the circuit substrate, and the circuit substrate is disposed on the flexible circuit board. The long axis of the first magnetic element is parallel of a first axis, the circuit substrate and the first magnetic element are spaced apart from each other along a second axis, and the first and second axes are perpendicular to the optical axis.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
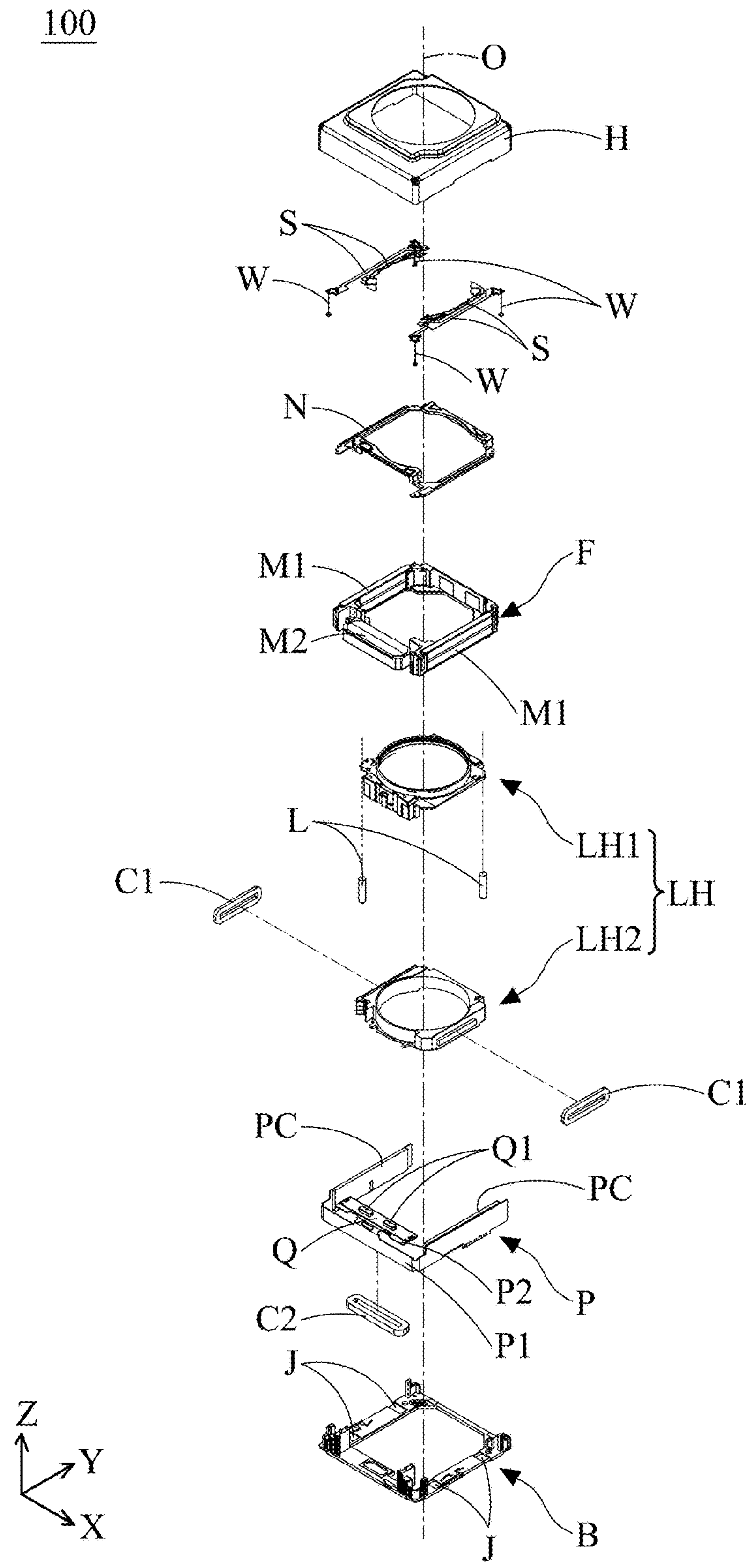
FIG. 1 is an exploded diagram of a driving mechanism 100 in accordance with an embodiment of the invention.
Figure 2:
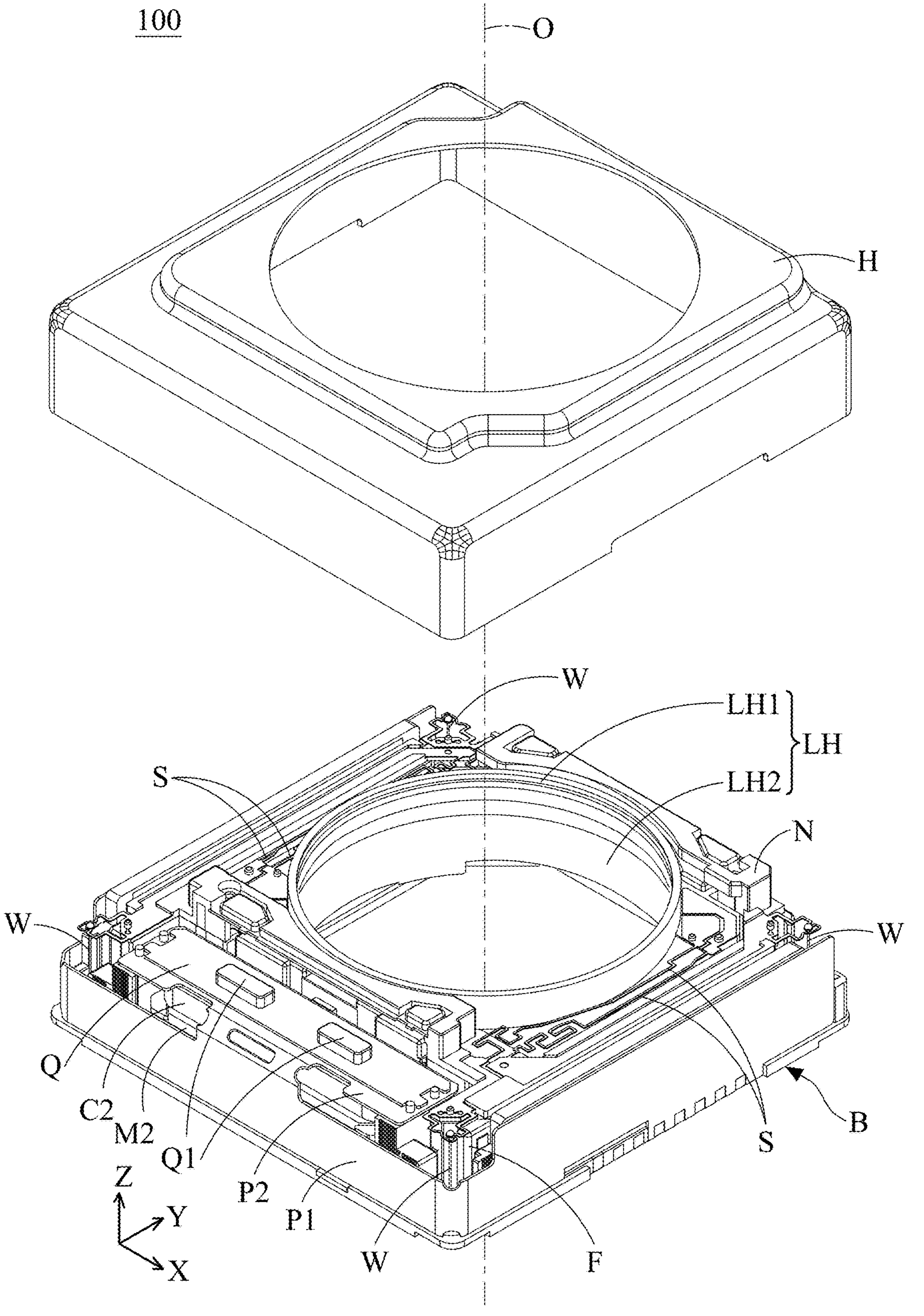
FIG. 2 is another exploded diagram of the driving mechanism 100 in FIG. 1.
Figure 3:
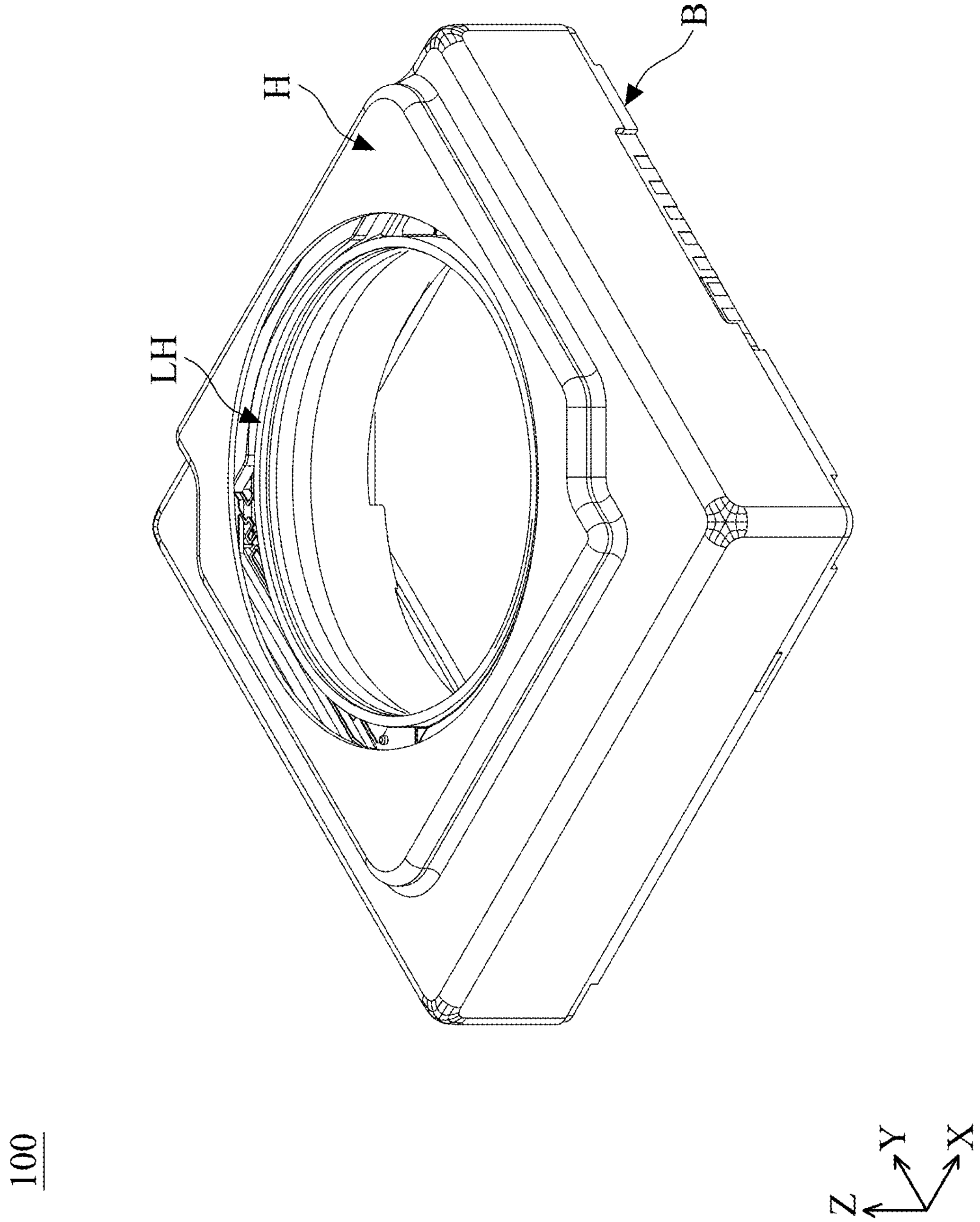
FIG. 3 is a perspective diagram of the driving mechanism 100 in FIGS. 1 and 2 after assembly.
Figure 4:
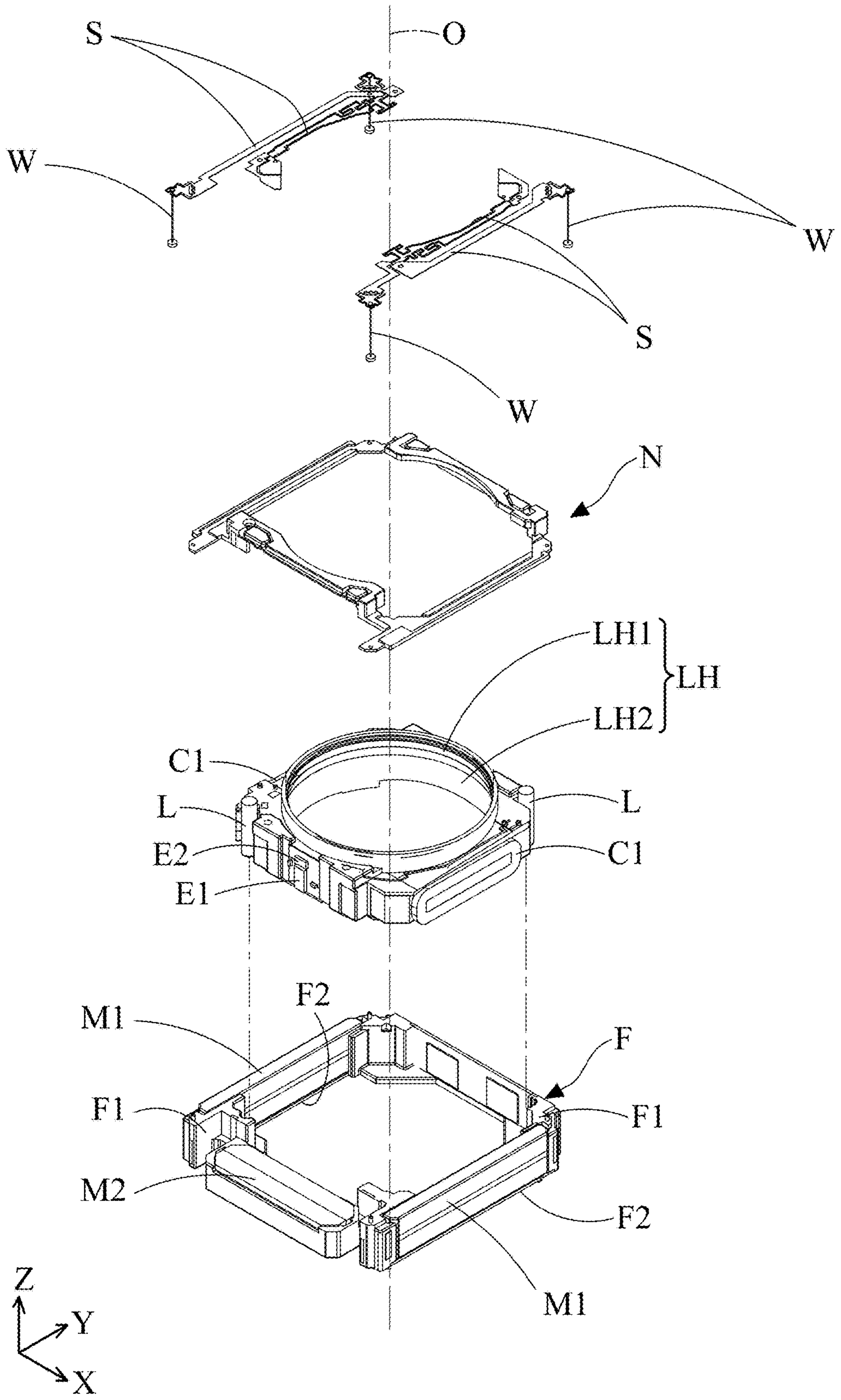
FIG. 4 is an exploded diagram of the driving mechanism 100 with the housing H, the base B, and the flexible circuit board P omitted therefrom.
Figure 5:
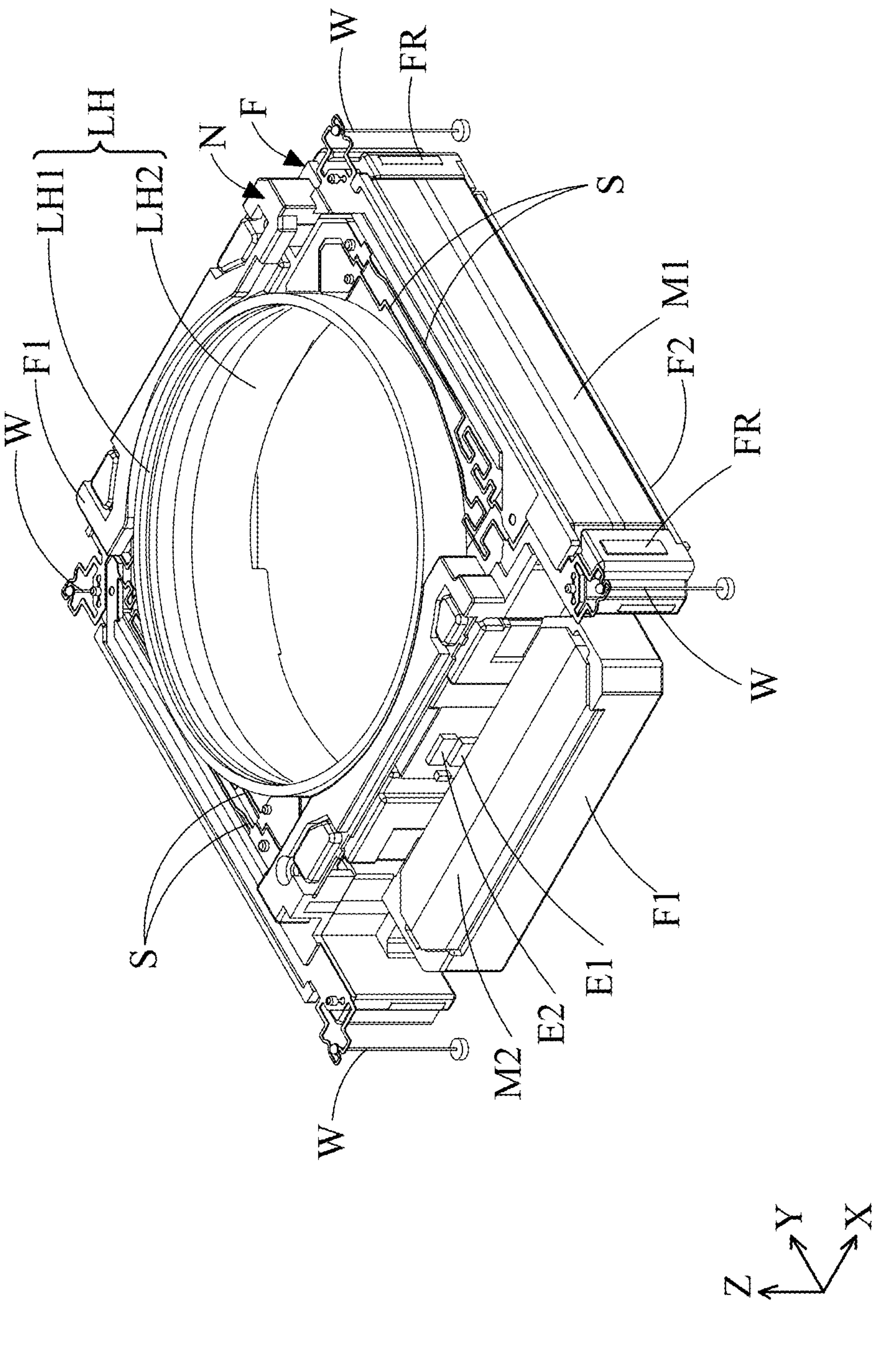
FIG. 5 is a perspective diagram of the driving mechanism 100 in FIG. 3 with the housing H, the base B, and the flexible circuit board P omitted therefrom.
Figure 6:
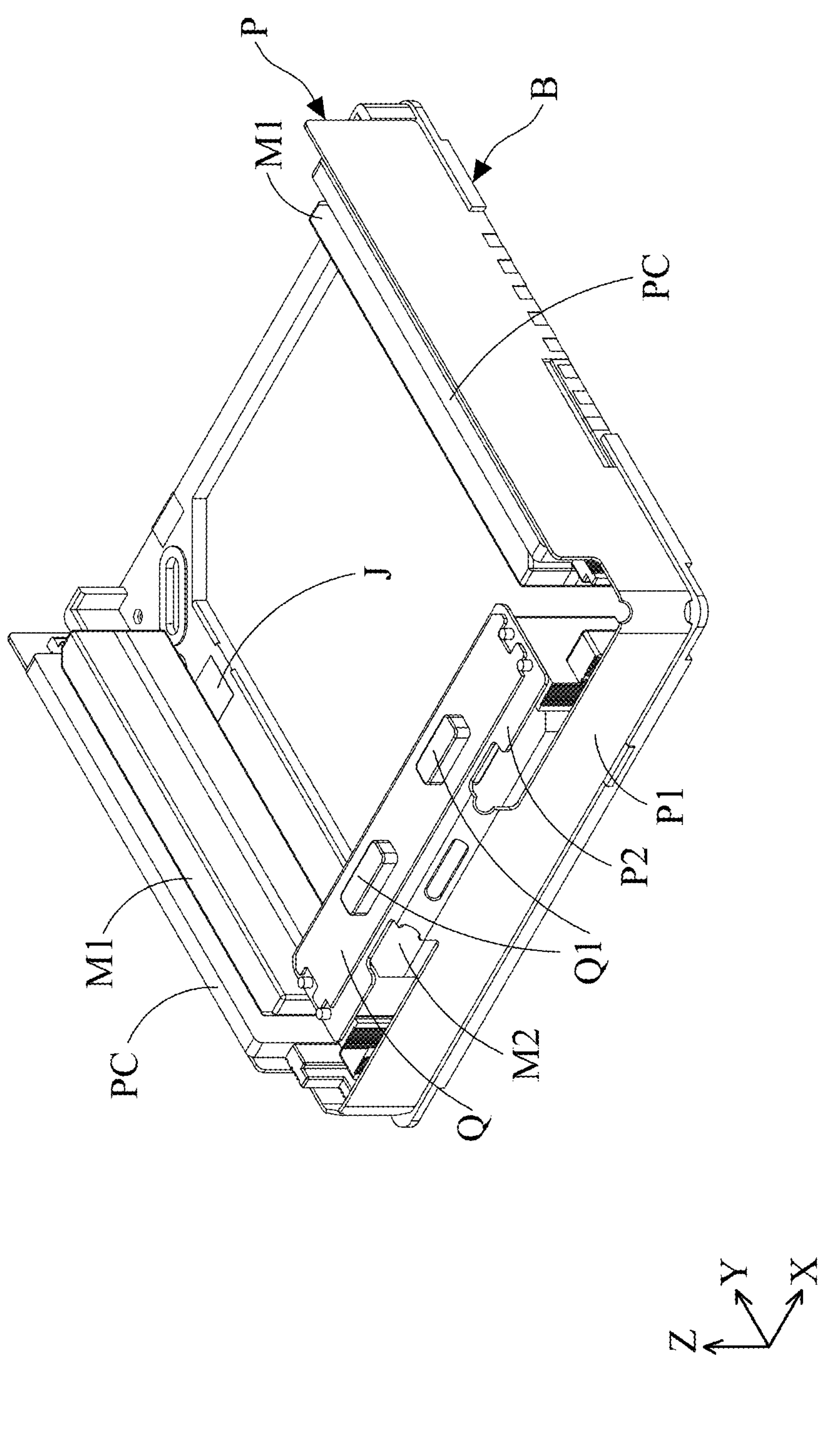
FIG. 6 is a perspective diagram showing the relative position of the base B, and the flexible circuit board P, and the first and second magnetic elements M1 and M2 of the driving mechanism 100.

FIG. 1 is an exploded diagram of a driving mechanism 100 in accordance with an embodiment of the invention. FIG. 2 is another exploded diagram of the driving mechanism 100 in FIG. 1. FIG. 3 is a perspective diagram of the driving mechanism 100 in FIGS. 1 and 2 after assembly. FIG. 4 is an exploded diagram of the driving mechanism 100 with the housing H, the base B, and the flexible circuit board P omitted therefrom. FIG. 5 is a perspective diagram of the driving mechanism 100 in FIG. 3 with the housing H, the base B, and the flexible circuit board P omitted therefrom. FIG. 6 is a perspective diagram showing the relative position of the base B, and the flexible circuit board P, and the first and second magnetic elements M1 and M2 of the driving mechanism 100.

Referring to FIGS. 1-6, the driving mechanism 100 is a Voice Coil Motor (VCM) which may be disposed in a cell phone or other portable electronic device for driving an optical element (e.g. optical lens) to move, thereby achieving the function of auto-focusing (AF) or Optical Image stabilization (OIS).

The driving mechanism 100 primarily comprises a hollow housing H, a base B, a flexible circuit board P, a holder LH, a frame F, a clamping member N, a plurality of resilient elements S, and a plurality of metal wires W. In this embodiment, the flexible circuit board P is adhered to the base B. The housing H has a hollow structure affixed to the base B, thus forming a fixed part of the driving mechanism 100.

The holder LH and the frame F are movably received in the housing H, wherein the holder LH is configured for holding an optical element (not shown). Here, the holder LH and the frame F constitute a movable part of the driving mechanism 100 that can move relative to the fixed part (the housing H and the base B).

In this embodiment, the resilient elements S are connected between the holder LH and the frame F. The metal wires W extend along the Z axis and are connected between the resilient elements S and the base B.

With the configuration as described above, external light can enter the driving mechanism 100 substantially along the optical axis O (Z axis) of the optical element, and light can propagate through the optical element to an image sensor (not shown) below the base B to form a digital image.

It should be noted that the holder LH has a first member LH1 and a second member LH2 affixed to each other. Two vertical coils C1 are disposed on opposite sides of the holder LH, and two first magnetic elements M1 (e.g. magnets) are disposed on opposite sides of the frame F, corresponding to the vertical coils C1.

When a current signal is applied to the vertical coils C1, an electromagnetic force can be generated by the vertical coils C1 and the first magnetic elements M1, so that the holder LH and the optical element received therein are driven to move relative to the frame F along the optical axis O (Z axis) to achieve the function of auto-focusing (AF) or optical Image stabilization (OIS).

In this embodiment, the clamping member N is affixed to the top side of the frame F. Two rods L are clamped between the holder LH and the clamping member N. The holder LH can stably slide relative to the frame F along the rods L which are parallel to the optical axis O and the Z axis.

The flexible circuit board P has a C-shaped main body P1 and a bent portion P2 bent relative to the main body P1. A horizontal coil C2 is disposed beneath the bent portion P2, and a second magnetic element M2 (e.g. magnet) is disposed on the frame F and adjacent to the horizontal coil C2. The horizontal coil C2 is electrically connected to the bent portion P2 of the flexible circuit board P. The horizontal coil C2 and the second magnetic element M2 are arranged along the Z axis, and the long axis of the horizontal coil C2 is perpendicular to the optical axis O (Z axis).

In addition, a metal member Q and at least a positioning post Q1 are disposed on the bent portion P2 of the flexible circuit board P. Two positioning posts Q1 extend through the metal member Q, the bent portion P2, and the horizontal coil C2. Therefore, the horizontal coil C2 can be precisely positioned on the bent portion P2. In this embodiment, the horizontal coil C2 comprises an enameled wire.

When a current signal is applied to the horizontal coil C2, an electromagnetic force can be generated by the horizontal coil C2 and the second magnetic element M2, so that the holder LH and the frame Fare driven to move relative to the base B along a first axis (Y axis) to achieve the function of auto-focusing (AF) or optical Image stabilization (OIS).

It can be seen in FIGS. 1 and 6 that two circuit substrates PC are disposed on opposite sides of the main body P1 of the flexible circuit board P. The circuit substrates PC are not parallel to the bent portion P2 of the flexible circuit board P, and the thickness of the flexible circuit board P is less than the thickness of the circuit substrates PC.

In this embodiment, a plurality of coils are disposed inside the circuit substrates PC and located adjacent to the first magnetic element M1. When a current signal is applied to the coils inside the circuit substrates PC, an electromagnetic force can be generated by the coils and the first magnetic element M1, so that the holder LH and the frame F are driven to move relative to the base B along a second axis (X axis) to achieve the function of auto-focusing (AF) or optical Image stabilization (OIS).

The vertical coils C1, the horizontal coils C2, the first and second magnetic elements M1 and M2, and the first and second coils C1 and C2 (FIGS. 7 and 8) inside the circuit substrates PC constitute a driving assembly of the driving mechanism 100 for driving the holder LH to move relative to the frame F, or driving the movable part (the holder LH and the frame F) to move relative to the fixed part (the base B and the housing H).

Moreover, as shown in FIGS. 1 and 4, a first electronic element E1 and a second electronic element E2 are disposed on the first member LH1 of the holder LH. The first electronic element E1 may be a Hall effect sensor for detecting the displacement of the second magnetic element M2 (e.g. magnet) disposed on the frame F. The second electronic element E2 may comprise an integrated circuit member, such as a control IC that is electrically connected to the first electronic element E1.

The frame F has two plastic bodys F1 and a U-shaped metal bracket F2 (FIG. 4) affixed to each other. The first magnetic element M1 is disposed on the metal bracket F2 and positioned between the two plastic bodies F1.

Figure 7:
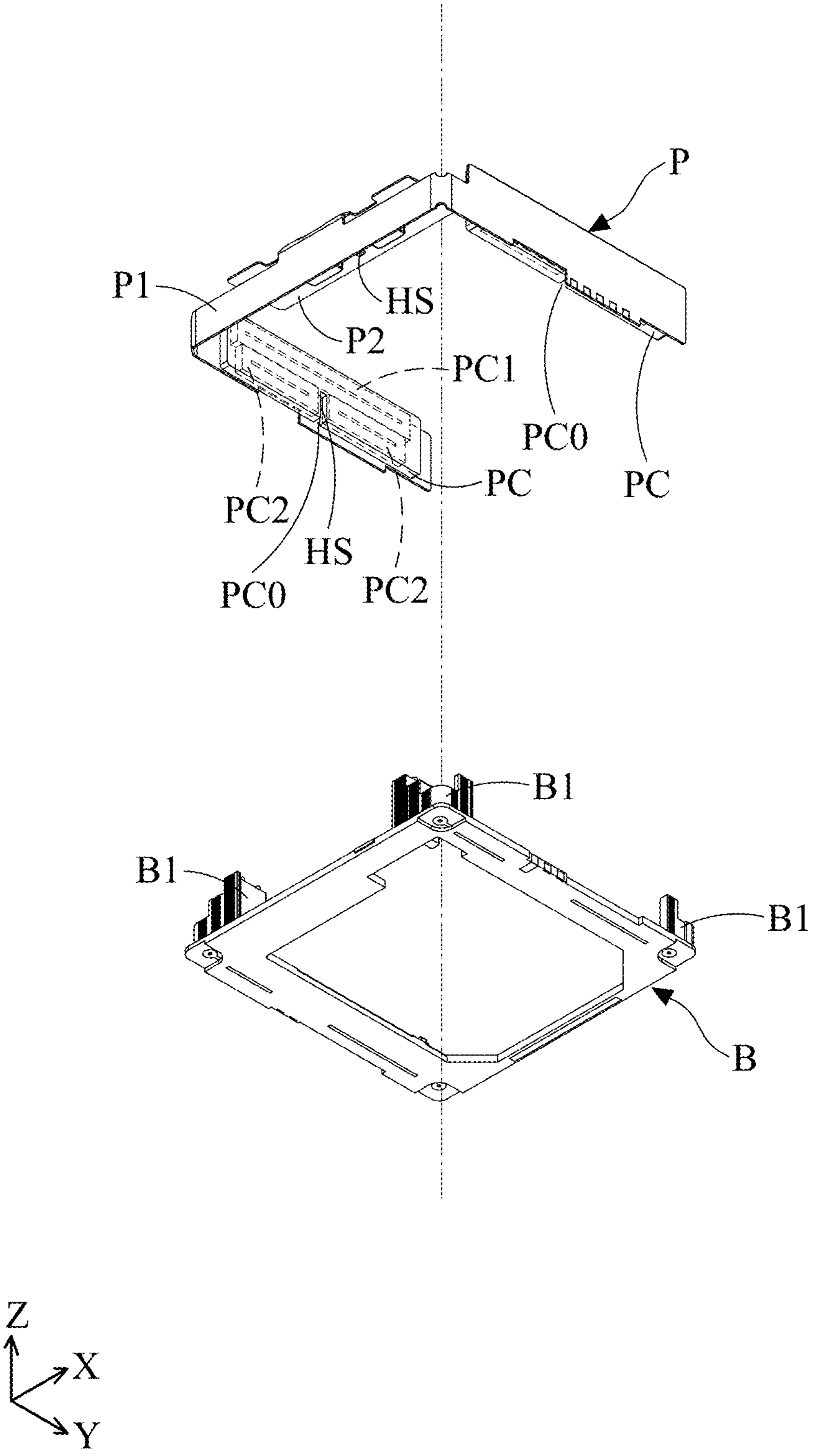
FIG. 7 shows an exploded view of the flexible circuit board P and the base B before assembly.
Figure 8:
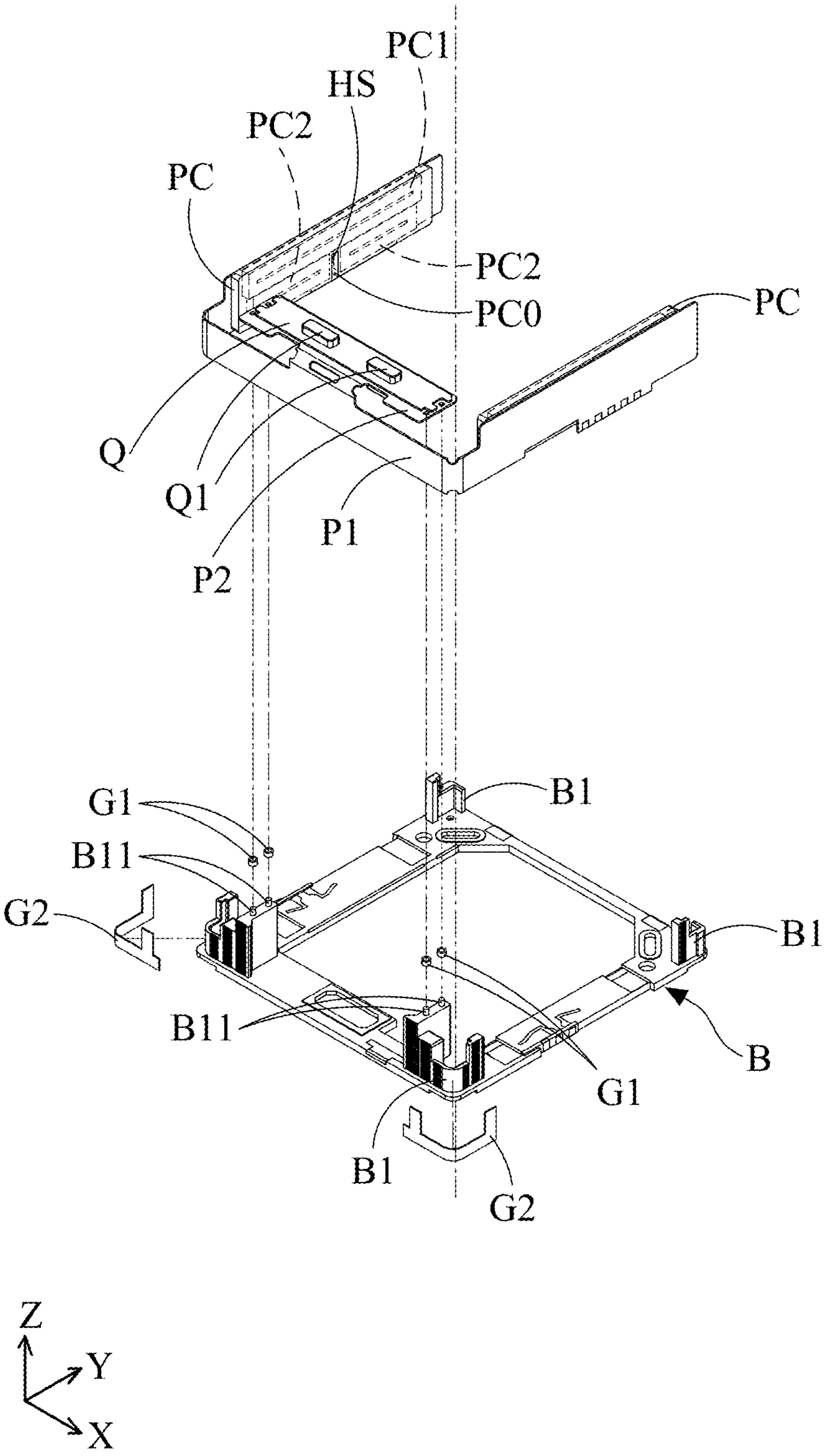
FIG. 8 shows another exploded view of the flexible circuit board P and the base B before assembly.
Figure 9:
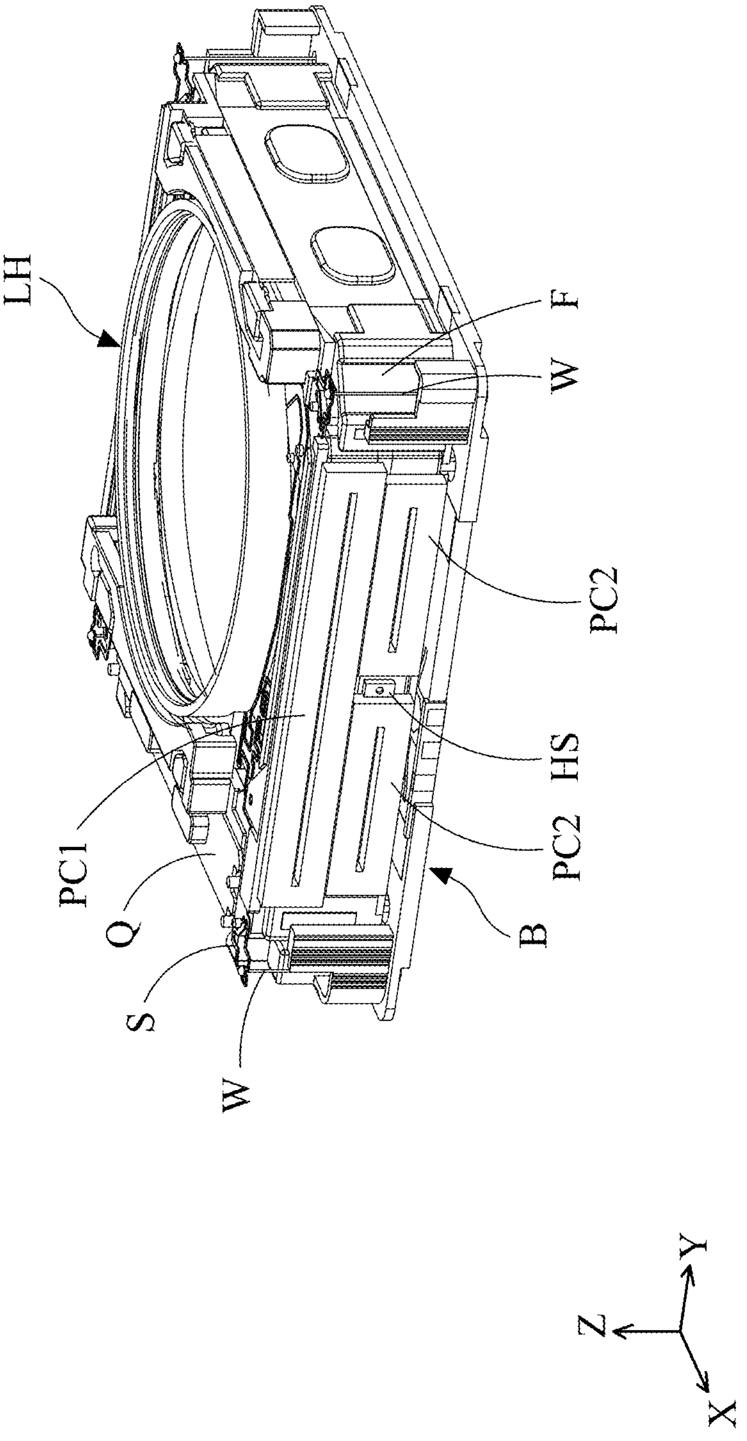
FIG. 9 shows the relative position of the first and second coils PC1, PC2 and the position sensor HS.
Figure 10:
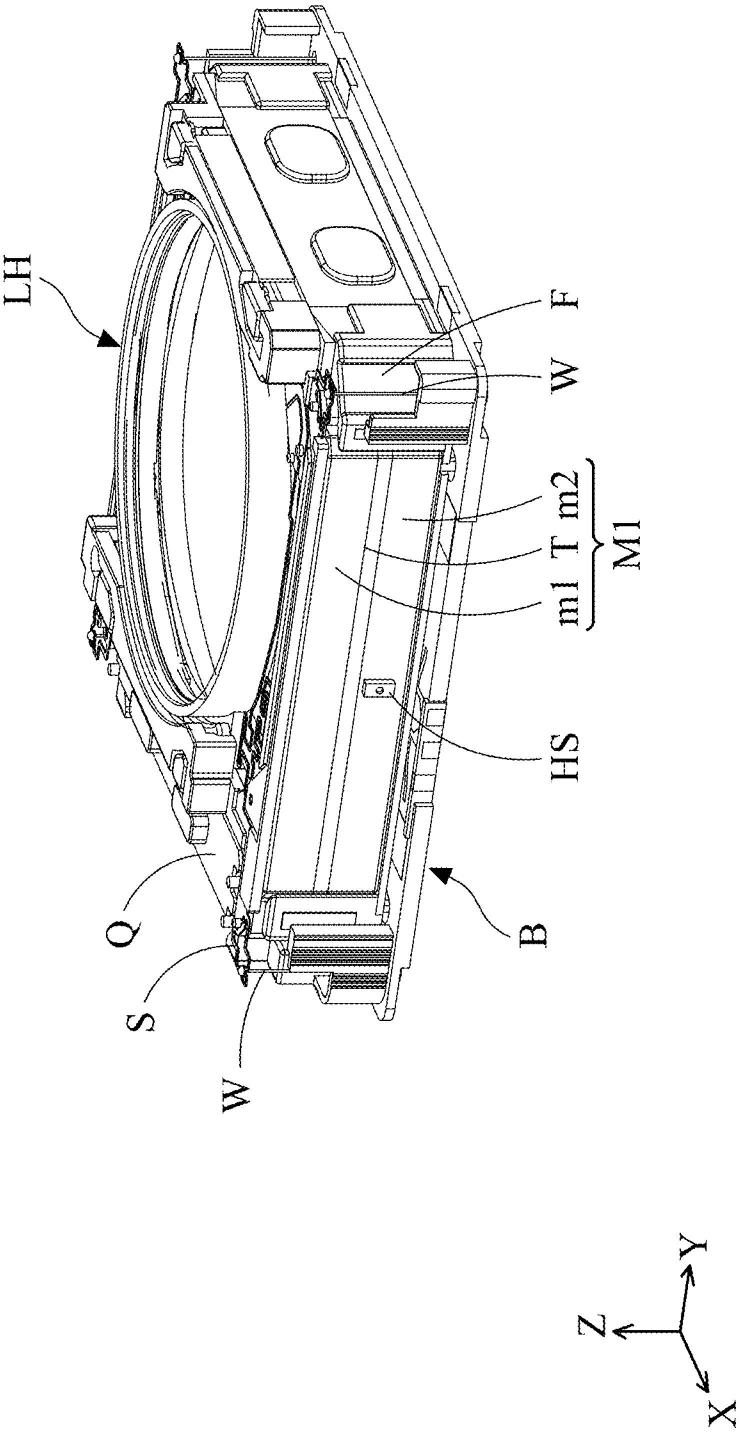
FIG. 10 shows the position sensor HS that is offset from the center of magnetic element M1 along the Z axis.

FIG. 7 shows an exploded view of the flexible circuit board P and the base B before assembly. FIG. 8 shows another exploded view of the flexible circuit board P and the base B before assembly. FIG. 9 shows the relative position of the first and second coils PC1, PC2 and the position sensor HS. FIG. 10 shows the position sensor HS that is offset from the center of magnetic element M1 along the Z axis.

As shown in FIGS. 7, 8, 9, and 10, the base B of this embodiment forms four protruding structures B1 that extend along the optical axis O (Z direction). At least one of the protruding structures B1 forms at least one positioning pin B11 (FIG. 8) extending through the bent portion P2 along the Z axis.

Specifically, a first coil PC1 and two second coils PC2 are disposed inside the circuit substrate PC and arranged along the Z axis. The first and second coils PC1 and PC2 (e.g. planar coils) are electrically connected to the flexible circuit board P and located adjacent to the first magnetic element M1, and they at least partially overlap along the Z axis.

The length of the first coil PC1 along the Y axis is greater than the length of the second coils PC2 along the Y axis. Moreover, a position sensor HS (e.g. Hall effect sensor) is provided on the flexible circuit board P and accommodated in a groove PC0 of the circuit substrate PC. The position sensor HS is located between the two second coils PC2 to detect the displacement of the movable part relative to the fixed part along the X axis.

It should be noted that the position sensor HS is lower than the center of the first magnetic element M1 in the Z axis. Here, the position sensor HS and the first magnetic element M1 at least partially overlap along the X axis, and the position sensor HS and the second coil PC2 at least partially overlap along the Y axis.

In this embodiment, the second coils PC2 do not protrude from the first coil PC1 along the Y axis. The position sensor HS and the first coil PC1 do not overlap along the Y axis. Moreover, the position sensor HS and the first coil PC1 at least partially overlap along the Z axis, and the position sensor HS and the second coil PC2 do not overlap along the Z axis.

It can be seen in FIG. 10 that the first magnetic element M1 includes a first magnetic unit m1 and a second magnetic unit m2 arranged along the Z axis. The first magnetic unit m1 and the first coil PC1 at least partially overlap along the X axis, and the second magnetic unit m2 and the second coil PC2 at least partially overlap along the X axis.

Moreover, the second magnetic unit m2 and the position sensor HS at least partially overlap along the X axis. The first magnetic unit m1 and the position sensor HS do not overlap along the X axis.

In this embodiment, the long axis of the first magnetic element M1 is parallel to the Y axis (the first axis). The circuit substrate PC and the first magnetic element M1 are spaced apart from each other along the X axis (the second axis).

Figure 11:
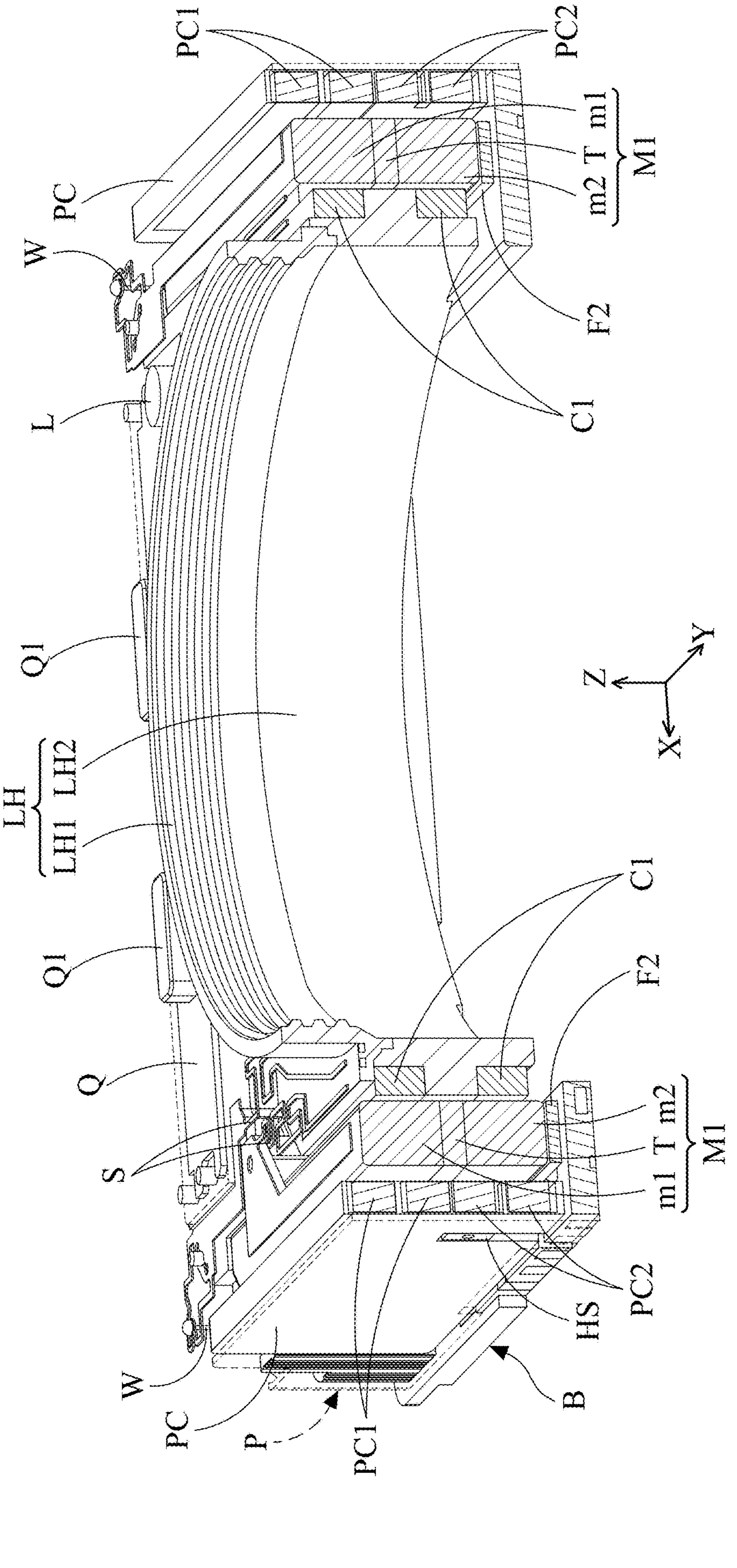
FIG. 11 shows a cross-sectional view of the driving mechanism 100 with the housing H removed therefrom.
Figure 12:
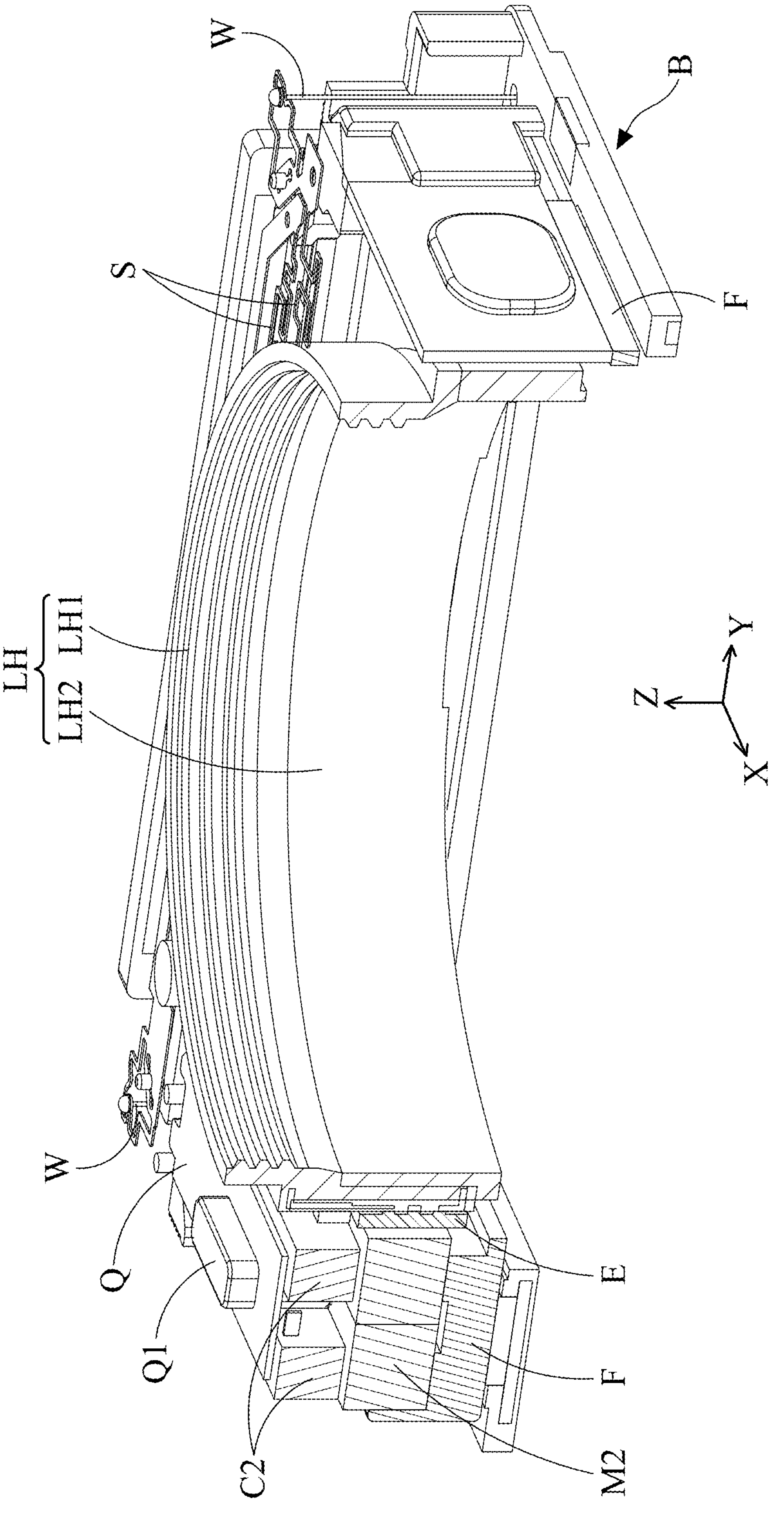
FIG. 12 shows another cross-sectional view of the driving mechanism 100 with the housing H removed therefrom.

FIG. 11 shows a cross-sectional view of the driving mechanism 100 with the housing H removed therefrom. FIG. 12 shows another cross-sectional view of the driving mechanism 100 with the housing H removed therefrom.

Referring to FIG. 11, a metal sheet T is disposed between the first magnetic unit m1 and the second magnetic unit m2, wherein the polar directions of the first magnetic unit m1 and the second magnetic unit m2 are different.

It should be noted that at least one magnetic permeable sheet J is disposed on the base B, as shown in FIG. 1. A magnetic attraction force can be generated between the magnetic permeable sheet J and the first magnetic element M1, so that the frame F is stably held above base B.

In this embodiment, the magnetic permeability of the magnetic permeable sheet J is higher than the magnetic permeability of the metal sheet T, wherein the second magnetic unit m2 is located between the metal sheet T and the magnetic permeable sheet J after assembly.

Figure 13:
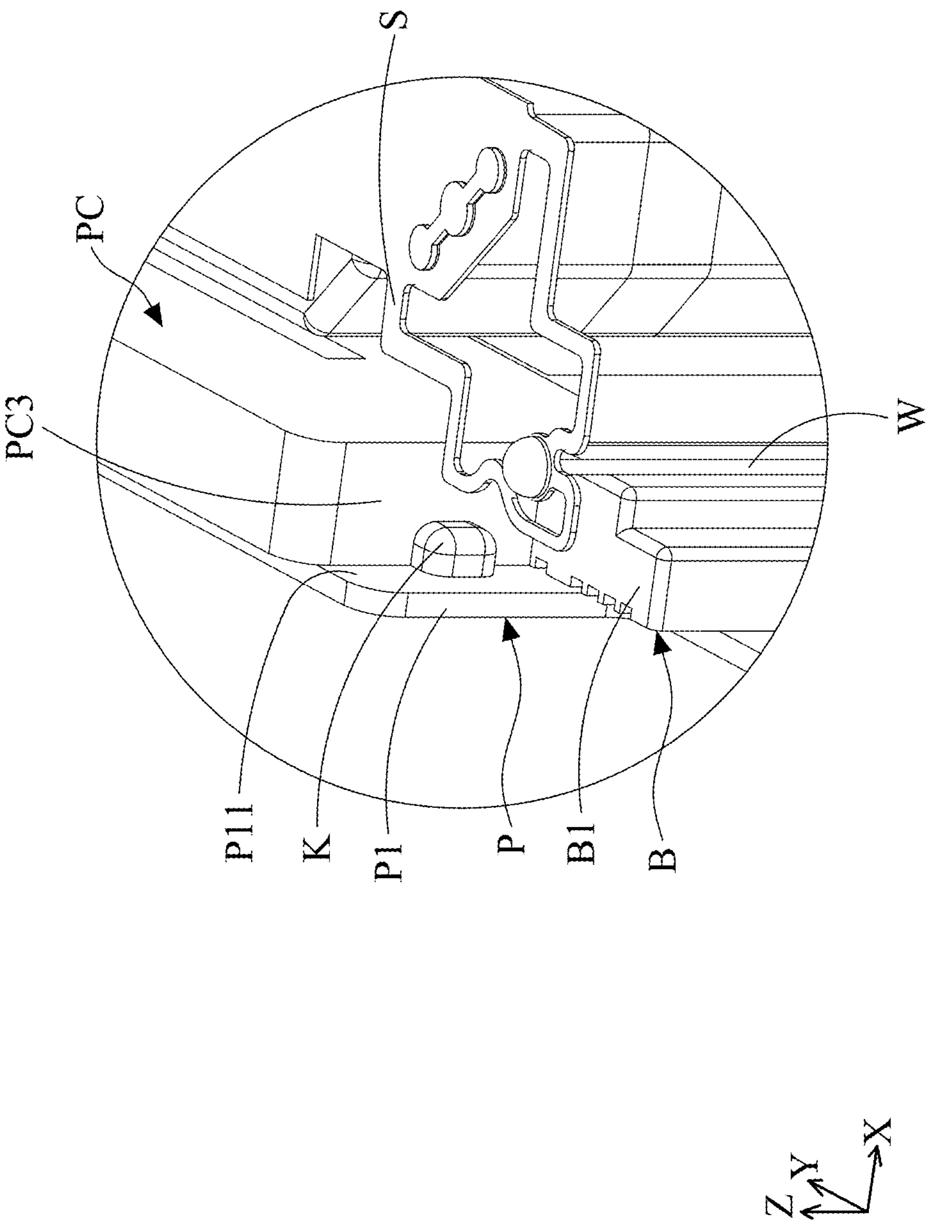
FIG. 13 shows a schematic diagram of the conductive element K connected between the inner surface P11 of the main body P1 of the flexible circuit board P and the lateral surface PC3 of the circuit substrate PC.

FIG. 13 shows a schematic diagram of the conductive element K connected between the inner surface P11 of the main body P1 of the flexible circuit board P and the lateral surface PC3 of the circuit substrate PC.

As shown in FIG. 13, a conductive element K (e.g. solder) is applied to the inner surface P11 of the main body P1 of the flexible circuit board P and the lateral surface PC3 of the circuit substrate PC, thus electrically connecting the flexible circuit board P to the circuit substrate PC. In this embodiment, the inner surface P11 faces the circuit substrate PC, and the lateral surface PC3 is adjacent to the inner surface P11.

Figure 14:
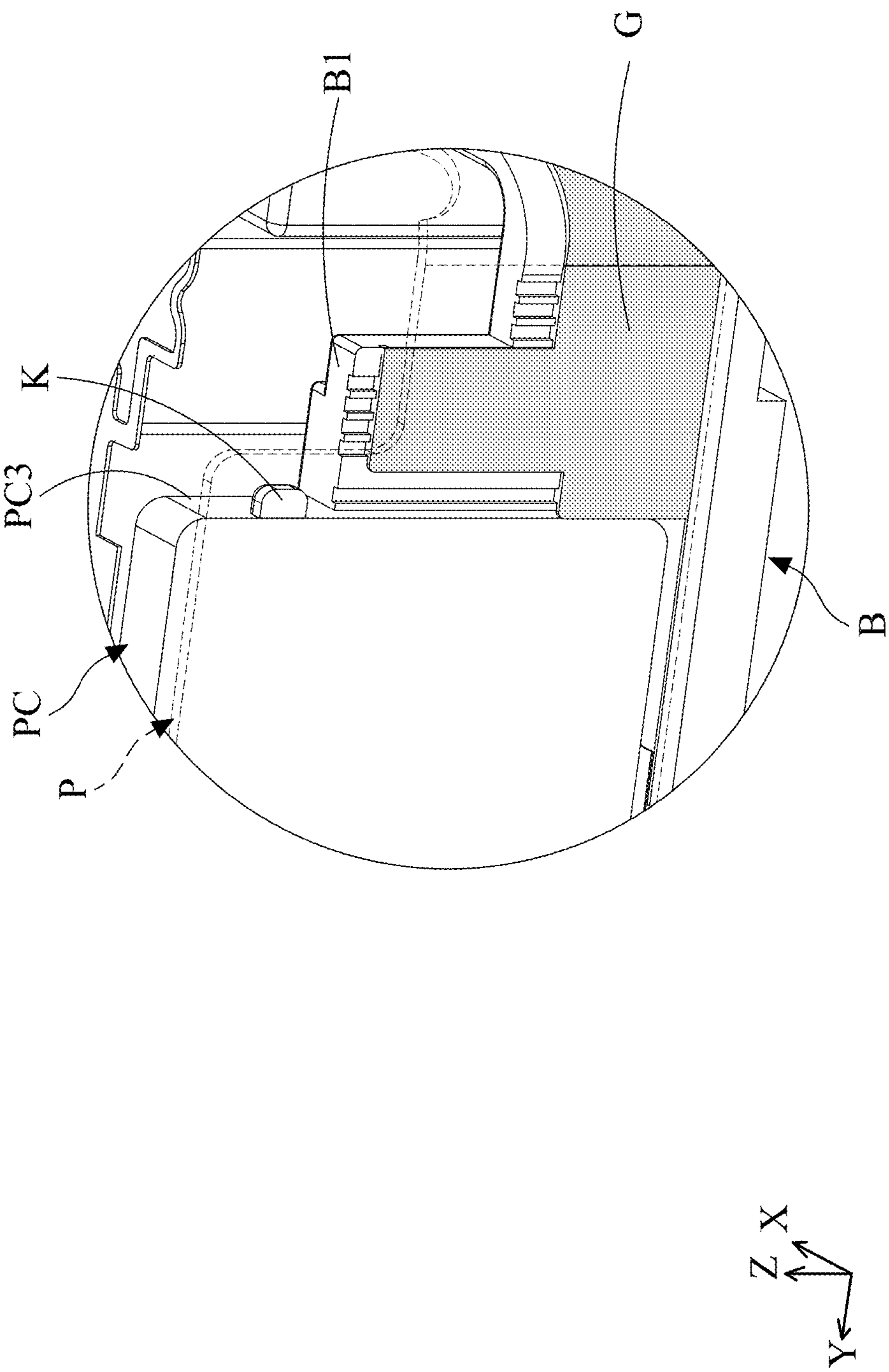
FIG. 14 shows a schematic diagram of the adhesive element G connected between the flexible circuit board P and the protruding structure B1 of the base B.

FIG. 14 shows a schematic diagram of the adhesive element G connected between the flexible circuit board P and the protruding structure B1 of the base B.

As shown in FIGS. 8 and 14, the base B has four protruding structures B1 extending in the Z direction. Two adhesive elements G (e.g. glue) are respectively applied to two of the protruding structures B1 (FIG. 8). Hence, the flexible circuit board P can be firmly connected to the base B, wherein the protruding structure B1 and the circuit substrate PC do not overlap along the X axis. In this embodiment, the adhesive element G is in contact with the circuit substrate PC, the protruding structure B1, and the flexible circuit board P (FIG. 14), whereby they can be firmly adhered to each other.

It can be seen in FIG. 5 that at least one buffer element FR (e.g. rubber or soft plastic bump) is disposed on the plastic body F1 of the frame F. When the movable part moves to a limit position relative to the fixed part along the X axis, the buffer element FR contacts the circuit substrate PC to prevent the first magnetic element M1 from being impacted by the circuit substrate PC.

In this embodiment, the hardness of the buffer element FR is smaller than the hardness of the base B and the plastic body F1 of the frame F. In addition, the hardness of the plastic body F1 is smaller than the hardness of the base B.

As shown in FIG. 12, the positioning post Q1 extends through the horizontal coil C2, and the distance between the positioning post Q1 and the second magnetic element M2 is smaller than the distance between the horizontal coil C2 and the second magnetic element M2. Hence, when the frame F moves relative to the base B in the Z direction, the positioning post Q1 can contact the second magnetic element M2, thereby preventing the second magnetic element M2 from direct collision with the horizontal coil C2.

In this embodiment, the top end of the positioning post Q1 may be adhered to the housing H during assembly, thus improving the structural strength and reliability of the driving mechanism 100.

It can be seen from FIG. 8 that the bent portion P2 of the flexible circuit board P can be adhered to the top surface of the protruding structure B1 through the first adhesive G1, and the main body P1 of the flexible circuit board P can be adhered to the outer surface of the protruding structure B1 through the second adhesive G2, wherein the first and second adhesives G1 and G2 are separated from each other.

With the configuration of the driving mechanism 100, the first magnetic element M1 can be used as a common magnetic element for the holder LH and the frame F, thereby reducing the size of the driving mechanism 100 and achieving the function of auto-focusing (AF) or Optical Image stabilization (OIS). Moreover, with the first electronic element E1 positioned corresponding to the second magnetic element M2, the number of the sensing magnets can be reduced, so as to achieve miniaturization and lightweight of the driving mechanism 100. Additionally, with the position sensor HS positioned between the second coils PC2, cross-talk errors caused by rotation of the movable part relative to the fixed part can be efficiently suppressed, thereby improving sensing accuracy of the driving mechanism 100.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element that has an optical axis, comprising:

a fixed part;

a flexible circuit board and a circuit substrate disposed on the fixed part, wherein the flexible circuit board has a main body and a bent portion bent relative to the main body;

a movable part, movably connected to the fixed part for holding the optical element, wherein the optical element has an optical axis; and a driving assembly, configured for moving the movable part relative to the fixed part, including a longitudinal first magnetic element, a first coil, a second coil, a horizontal coil, and a second magnetic element, wherein the first magnetic element is disposed on the movable part, the first and second coils are disposed in the circuit substrate, and the circuit substrate is disposed on the flexible circuit board;

wherein the long axis of the first magnetic element is parallel of a first axis, the circuit substrate and the first magnetic element are spaced apart from each other along a second axis, and the first and second axes are perpendicular to the optical axis;

wherein the horizontal coil is disposed on the bent portion, and the second magnetic element is disposed on the movable part and located adjacent to the horizontal coil.

2. The driving mechanism as claimed in claim 1, further comprising an adhesive element, wherein the fixed part has a protruding structure extending along the optical axis, and the adhesive element is connected between the protruding structure and the flexible circuit board, wherein the protruding structure and the circuit substrate do not overlap along the second axis.

3. The driving mechanism as claimed in claim 2, wherein the adhesive element is in contact with the circuit substrate, the flexible circuit board, and the protruding structure.

4. The driving mechanism as claimed in claim 1, further comprising a buffer element disposed on the movable part, wherein when the movable part moves to a limit position relative to the fixed part along the second axis, the buffer element contacts the circuit substrate.

5. The driving mechanism as claimed in claim 4, wherein the hardness of the buffer element is smaller than the hardness of the movable part.

6. The driving mechanism as claimed in claim 4, wherein the hardness of the buffer element is smaller than the hardness of the fixed part.

7. The driving mechanism as claimed in claim 4, wherein the hardness of the movable part is smaller than the hardness of the fixed part.

8. The driving mechanism as claimed in claim 1, wherein the horizontal coil is electrically connected to the bent portion, and the long axis of the horizontal coil is perpendicular to the optical axis.

9. The driving mechanism as claimed in claim 1, wherein the horizontal coil and the second magnetic element are arranged along the optical axis.

10. The driving mechanism as claimed in claim 9, further comprising a positioning post extending through the horizontal coil and the bent portion of the flexible circuit board along the optical axis.

11. The driving mechanism as claimed in claim 10, wherein the distance between the positioning post and the second magnetic element is smaller than the distance between the horizontal coil and the second magnetic element.

12. The driving mechanism as claimed in claim 10, wherein the fixed part has a housing and a base connected to each other, and the positioning post is adhered to the housing.

13. The driving mechanism as claimed in claim 10, wherein the fixed part has a protruding structure extending along the optical axis, the bent portion of the flexible circuit board is adhered to the protruding structure through a first adhesive, and the main body of the flexible circuit board is adhered to the protruding structure through a second adhesive that is separated from the first adhesive.

14. The driving mechanism as claimed in claim 10, further comprising a metal member disposed on the bent portion of the flexible circuit board, wherein the positioning post extends through the metal member.

15. The driving mechanism as claimed in claim 10, wherein the fixed part has a protruding structure extending along the optical axis, and the protruding structure forms a positioning pin extending through the bent portion of the flexible circuit board.

16. The driving mechanism as claimed in claim 1, wherein the circuit substrate is not parallel to the bent portion of the flexible circuit board.

17. The driving mechanism as claimed in claim 1, wherein the main body of the flexible circuit board has a C-shaped structure.

18. The driving mechanism as claimed in claim 1, wherein the horizontal coil comprises an enameled wire.

* * * * *